US005881755A

United States Patent [19]

[11] Patent Number: 5,881,755

Dieringer

[45] Date of Patent: Mar. 16, 1999

[54] WATER SUPPLY CONTROL APPARATUS AND METHOD FOR USE IN HOMES OR OTHER STRUCTURES

[76] Inventor: Dale E. Dieringer, P.O. Box 741345, Arvada, Colo. 80006-1345

[21] Appl. No.: 964,932

[22] Filed: Nov. 5, 1997

[51] Int. Cl.[6] .................... F16K 31/02

[52] U.S. Cl. .................... 137/1; 251/129.04

[58] Field of Search .................... 251/129.04, 129.03, 251/129.01; 137/1

[56] References Cited

U.S. PATENT DOCUMENTS

| | | | |
|---|---|---|---|
| 3,204,484 | 9/1965 | Gustafson | 251/129.03 X |
| 4,398,562 | 8/1983 | Saarem et al. | 251/129.03 X |
| 4,646,962 | 3/1987 | Grant | 236/10 |
| 4,838,310 | 6/1989 | Scott et al. | 251/129.04 X |

*Primary Examiner*—Kevin Lee
*Attorney, Agent, or Firm*—Richard W. Hanes

[57] ABSTRACT

A water supply control apparatus for use in homes or other structures is provided that incorporates a battery-operated radio frequency wall switch transmitter and an electrical plug-in receiver regulating the open or closed state of an electrical solenoid valve in fluid communication with a structure's water supply. A by-pass switch enabling manual regulation of the solenoid valve is mounted on the valve itself. Also provided is a method of controlling the flow of water supplied to a structure utilizing radio frequency pulse broadcasts to regulate the open or closed state of the solenoid valve.

14 Claims, 2 Drawing Sheets

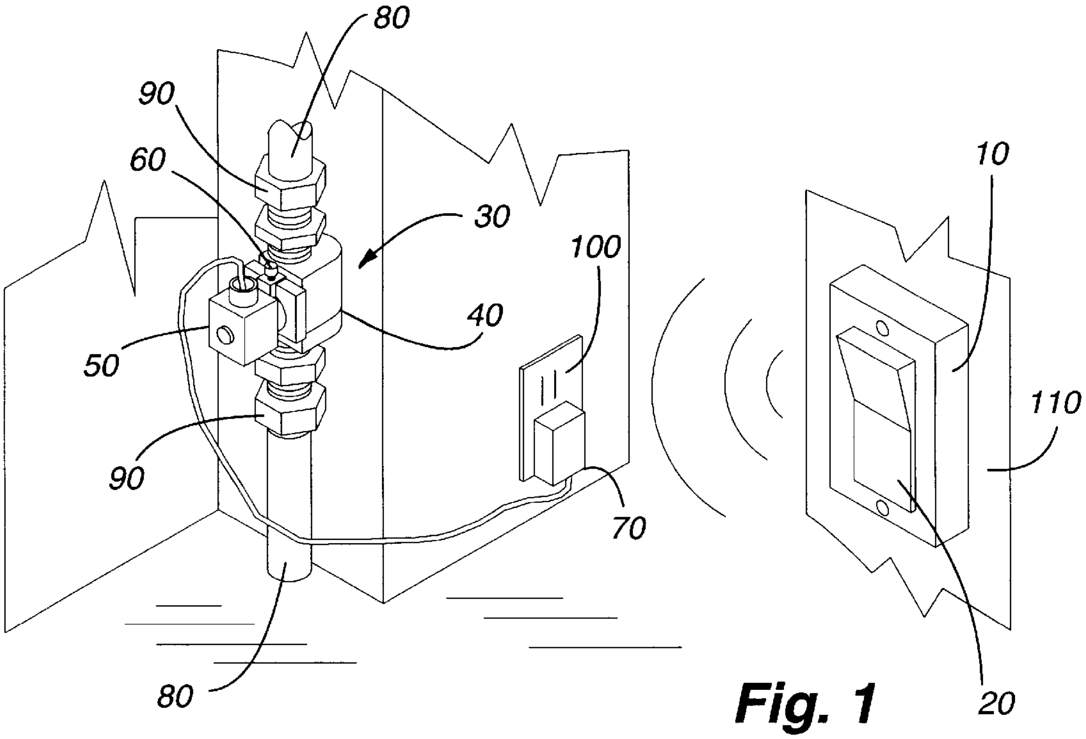
Fig. 1
Fig. 2
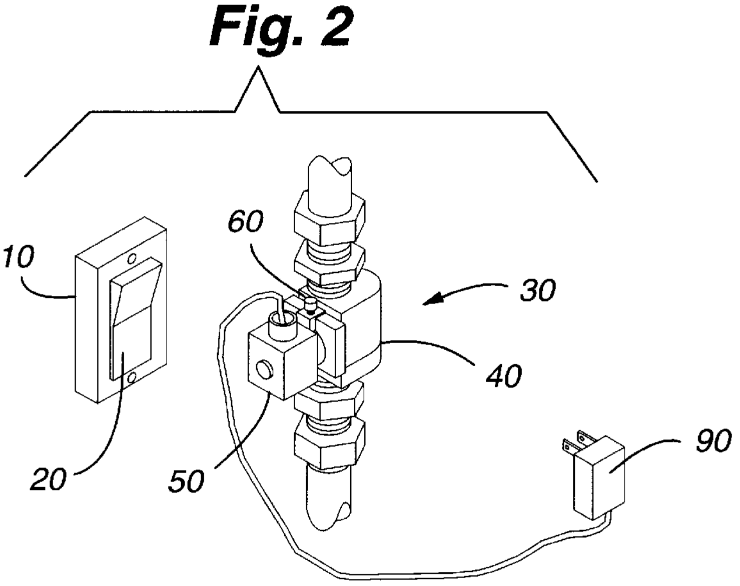

WATER SUPPLY CONTROL APPARATUS AND METHOD FOR USE IN HOMES OR OTHER STRUCTURES

FIELD OF INVENTION

The present invention relates to a convenient home, or other structure, water supply control apparatus and a method for using same.

BACKGROUND OF THE INVENTION

Virtually all owners of improved property recognize the threat to their structures posed by water damage caused by plumbing leakage. Investigation of this problem reveals that cleanup and repair costs attributable to water damage exceed one billion dollars annually. It destroys wallboard, wallpaper and paint, electrical fixtures and wiring, carpeting and padding, vinyl flooring, subflooring, and all manner of furniture and decorative items. Irreplaceable items such as financial records, photos, and mementos are destroyed beyond retrieval. Additionally, the occupants of the damaged property can expect to be driven from their structures during cleanup and repairs. Following such repairs, the structure will likely be permanently subject to mildew and related odors.

Structural water damage due to plumbing leakage occurs most often while the occupants are not present. Causes of such leakage range from frozen pipes that break resulting in water flow when thawing occurs, broken lines connected to shut-off valves attached to toilet tanks, refrigerator ice-makers, dishwashers, or a broken hose connected to a washing machine. The breaks in these lines are often caused by the nearly instantaneous closing of associated valves. Such closing causes a hammering effect on the line, in turn causing breakage in any weak areas.

Many people do not know the location of the main water shut-off valve in their structure. In addition, it is often the case that water leakage occurs due to a natural catastrophe, which is typically accompanied by an electrical power outage. Because water damage can be severe in a relatively short amount of time, a search throughout a structure, particularly a darkened one, for the water shut-off valve can result in disaster.

What is needed in the art is an apparatus allowing a structure's occupant to conveniently turn off the water supply to his or her structure each time they leave. Additionally, in the event of a power outage, the apparatus should enable automatic shutoff of the structure's water supply, thereby alleviating the necessity of manual shut-off. The present invention accomplishes these objectives by utilizing a battery-operated radio frequency wall switch transmitter and an electrical plug-in receiver controlling an electrical solenoid valve or electrically-actuated ball valve in fluid communication with a structure's water supply. When plugged in to an energized electrical wall outlet, the default setting of the solenoid valve is open, thus allowing water flow through the valve and into the structure. In the event of a power outage with concomitant loss of power to the wall outlet, the solenoid valve closes thereby preventing water flow into the structure. The solenoid valve incorporates a by-pass switch allowing, if desired, water flow through the line into the structure during a power outage. When activated, the wall switch transmitter broadcasts a radio frequency pulse to the receiver which in turn shuts the solenoid valve off, thereby preventing water flow into the structure. Upon deactivation, the wall switch transmitter broadcasts a second radio frequency pulse to the receiver which in turn opens the solenoid valve, thereby allowing water flow into the structure.

SUMMARY OF THE INVENTION

The primary aspect of the present invention is to provide an apparatus allowing a structure's occupant to conveniently turn off the water supply to his or her structure each time they leave.

Another aspect of the present invention is to provide an apparatus that enables automatic shut-off of the structure's water supply in the event of a power outage, thereby alleviating the necessity of manual shut-off.

Another aspect of the present invention is to provide an automatic water supply shut-off apparatus incorporating a by-pass switch allowing, if desired, water flow through the line into the structure during a power outage.

Another aspect of the present invention is to provide a method of conveniently controlling the ingress of water flow into a structure.

Additional aspects, advantages and novel features of the invention will be set forth in part in the description which follows, and in part will become apparent to those skilled in the art upon examination of the following or may be learned by practice of the invention. The aspects and advantages of the invention may be realized and attained by means of the instrumentalities and combinations particularly pointed out in the appended claims.

The present invention provides an apparatus allowing a structure's occupant to conveniently turn off the water supply to his or her structure each time they leave. Additionally, in the event of a power outage, the apparatus enables automatic shut-off of the structure's water supply, thereby alleviating the necessity of manual shut-off. The present invention accomplishes these objectives by utilizing a battery-operated radio frequency wall switch transmitter and an electrical plug-in receiver controlling an electrical solenoid-valve or electrically-actuated ball valve in fluid communication with a structure's water supply. When plugged in to an energized electrical wall outlet, the default setting of the solenoid valve is open, thus allowing water flow through the valve and into the structure. In the event of a power outage with concomitant loss of power to the wall outlet, the solenoid valve closes thereby preventing water flow into the structure. The solenoid valve incorporates a by-pass switch allowing, if desired, water flow through the line into the structure during a power outage. When activated, the wall switch transmitter broadcasts a radio frequency pulse to the receiver which in turn shuts the solenoid valve off, thereby preventing water flow into the structure. Upon deactivation, the wall switch transmitter broadcasts a second radio frequency pulse to the receiver which in turn opens the solenoid valve, thereby allowing water flow into the structure.

BRIEF DESCRIPTION OF THE DRAWINGS

FIG. 1 is a top perspective view of the preferred embodiment home water supply shut-off apparatus in operation.

FIG. 2 is a top perspective view of the preferred embodiment home water supply shut-off apparatus.

Figure 3:
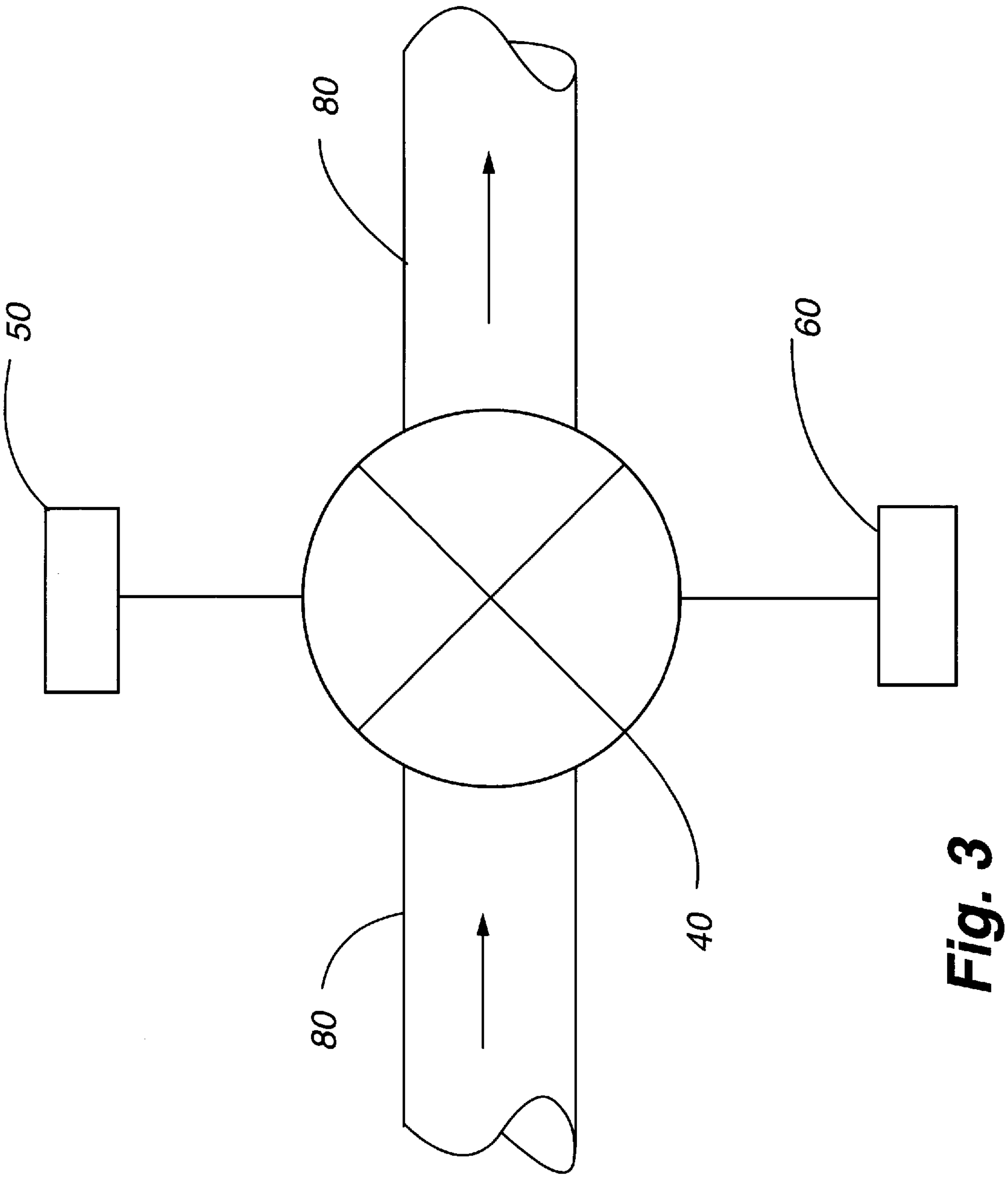
FIG. 3 is a schematic view of the solenoid valve implemented by the preferred embodiment home water supply shut-off apparatus in operative fluid communication with home water supply plumbing.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Referring to FIG. 2 a wall transmitter 10 is controlled by an incorporated electrical switch 20. Solenoid-valve assembly 30 is comprised of valve body 40 with attached solenoid 50 and by-pass switch 60. Solenoid 50 is in serial electrical connection with plug-in receiver 70.

Referring next to FIG. 1 the solenoid-valve assembly 30 is serially connected to home water supply piping 80 by compression nuts 90. Plug-in receiver 70 is connected to wall electrical outlet 100. Wall transmitter 10 is attached to wall 110 in close proximity to, that is, in operative range of, plug-in receiver 70. When wall electrical outlet 100 supplies electrical power, solenoid 50 is in an open state, thereby allowing water to flow through valve body 40 and into the structure. When electrical power to electrical outlet 100 is interrupted, solenoid 50 changes to a closed state, thereby preventing water from flowing through valve body 40 and into the structure. By-pass switch 60 may be pressed in and rotated clockwise in order to open solenoid 50, thereby allowing water flow through valve body 40. By-pass switch 60 may be rotated counter-clockwise in order to close solenoid 50, thereby preventing water flow through valve body 40. When electrical switch 20 is activated, wall transmitter 10 broadcasts a radio frequency pulse to plug-in receiver 70 which in turn sets solenoid 50 to a closed state, thereby preventing water from flowing through valve body 40 and into the structure. When electrical switch 20 is deactivated, wall transmitter 10 broadcasts a second radio frequency pulse to plug-in receiver 70 which in turn sets solenoid 50 to an open state, thereby allowing water flow through valve body 40 and into the structure.

Referring next to FIG. 3 valve body 40 is serially connected to home water supply piping 80. Water flow through valve body 40 is controllably prevented or allowed by either solenoid 50 or by-pass switch 60.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A water supply control apparatus comprising:

a fluid flow regulator;

a radio frequency receiver in serial electrical connection with said fluid flow regulator enabling state control of said fluid flow regulator by changing a state of said fluid flow regulator upon receipt of a radio frequency pulse; and a radio frequency transmitter enabling state control of said fluid flow regulator by transmitting a radio frequency pulse to said receiver.

2. The apparatus of claim 1 wherein said fluid flow regulator further comprises a solenoid valve.

3. The apparatus of claim 1 wherein said fluid flow regulator further comprises an electrically-actuated ball valve.

4. The apparatus of claim 1 further comprising a manual adjuster mounted to said fluid flow regulator enabling state control of said fluid flow regulator.

5. The apparatus of claim 4 wherein said manual adjuster further comprises a knob.

6. The apparatus of claim 1 wherein said transmitter is battery-powered.

7. The apparatus of claim 1 wherein said transmitter is wall-mounted.

8. A method of controlling the flow of water supplied to a structure through main water supply plumbing of the structure comprising the steps of:

energizing a receiver;

providing a transmitter in close proximity to said receiver;

placing a fluid flow regulator in fluid communication with the main water supply plumbing of the structure;

serially electrically connecting said receiver to said fluid flow regulator;

broadcasting a first radio frequency pulse from said transmitter to said receiver thereby setting said fluid flow regulator to a closed state; and broadcasting a second radio frequency pulse from said transmitter to said receiver thereby setting said fluid flow regulator to an open state.

9. The method of claim 1 wherein said receiver further comprises a radio frequency receiver.

10. The method of claim 8 wherein said transmitter further comprises a radio frequency transmitter.

11. The method of claim 8 wherein said transmitter is battery-powered.

12. The method of claim 8 wherein said transmitter is wall-mounted.

13. The method of claim 8 wherein said fluid flow regulator further comprises a solenoid valve.

14. The method of claim 8 wherein said fluid flow regulator further comprises an electrically-actuated ball valve.

* * * * *